United States Patent
Ala-Luukko et al.

(10) Patent No.: US 8,929,333 B2
(45) Date of Patent: Jan. 6, 2015

(54) NODE, SYSTEM AND METHOD FOR ROUTING TRAFFIC IN COMMUNICATIONS SYSTEM IN WHICH CALL CONTROL AND SIGNALING IS SEPARATED FROM TRAFFIC

(75) Inventors: Sami Ala-Luukko, Helsinki (FI); Tero Jalkanen, Tuusula (FI); Jari Weckman, Lempäälä (FI)

(73) Assignee: Teliasonera AB, Stockholm (SE)

( * ) Notice: Subject to any disclaimer, the term of this patent is extended or adjusted under 35 U.S.C. 154(b) by 496 days.

(21) Appl. No.: 12/735,421

(22) PCT Filed: Jan. 15, 2009

(86) PCT No.: PCT/FI2009/050032
§ 371 (c)(1),
(2), (4) Date: Jul. 15, 2010

(87) PCT Pub. No.: WO2009/090307
PCT Pub. Date: Jul. 23, 2009

(65) Prior Publication Data
US 2010/0309879 A1   Dec. 9, 2010

(30) Foreign Application Priority Data
Jan. 17, 2008  (FI) ................................ 20085042

(51) Int. Cl.
*H04W 4/00* (2009.01)
*H04W 8/02* (2009.01)
*H04W 76/02* (2009.01)
*H04L 29/06* (2006.01)
*H04W 8/08* (2009.01)
*H04W 80/10* (2009.01)

(52) U.S. Cl.
CPC ............... *H04W 8/02* (2013.01); *H04W 76/02* (2013.01); *H04L 65/103* (2013.01); *H04W 8/082* (2013.01); *H04W 80/10* (2013.01); *H04L 65/1016* (2013.01)
USPC ........... 370/331; 370/328; 370/354; 370/356; 370/467; 709/223; 455/445

(58) Field of Classification Search
None
See application file for complete search history.

(56) References Cited

U.S. PATENT DOCUMENTS

| | | | |
|---|---|---|---|
| 6,751,204 B1 * | 6/2004 | Foti et al. | 370/328 |
| 6,832,088 B1 * | 12/2004 | Stumpert | 455/445 |
| 6,947,747 B1 | 9/2005 | Stümpert | |
| 2004/0165594 A1 * | 8/2004 | Faccin et al. | 370/395.2 |
| 2004/0172464 A1 * | 9/2004 | Nag | 709/223 |
| 2007/0047508 A1 * | 3/2007 | Yamada et al. | 370/338 |
| 2007/0232301 A1 * | 10/2007 | Kueh | 455/433 |
| 2009/0232147 A1 | 9/2009 | Belling et al. | |

FOREIGN PATENT DOCUMENTS

| | | |
|---|---|---|
| EP | 1 841 275 A2 | 10/2007 |
| WO | WO 98/11753 | 3/1998 |
| WO | WO 00/33600 | 6/2000 |
| WO | WO 01/06800 A1 | 1/2001 |

(Continued)

*Primary Examiner* — Ayaz Sheikh
*Assistant Examiner* — Hai-Chang Hsiung
(74) *Attorney, Agent, or Firm* — Cozen O'Connor

(57) ABSTRACT

When a connection is established between user terminals in a system supporting the separation of control traffic and user traffic into separate network nodes, the routing of user traffic is optimized by not reserving resources for the user traffic in the home network (H-MSC) of a user terminal if the user terminal is roaming (4-8).

12 Claims, 2 Drawing Sheets

(56) References Cited

FOREIGN PATENT DOCUMENTS

| WO | WO 01/13657 A1 | 2/2001 |
| WO | WO 02/03582 A2 | 1/2002 |
| WO | WO 02/39778 A1 | 5/2002 |
| WO | WO 2007/045522 A1 | 4/2007 |

* cited by examiner

NODE, SYSTEM AND METHOD FOR ROUTING TRAFFIC IN COMMUNICATIONS SYSTEM IN WHICH CALL CONTROL AND SIGNALING IS SEPARATED FROM TRAFFIC

PRIORITY CLAIM

This is the U.S. national stage of application No. PCT/FI2009/050032, filed on 15 Jan. 2009. Priority is claimed from Finland Patent Application No. 20085042, filed 17 Jan. 2008, the entire content of which is expressly incorporated herein by reference.

FIELD OF THE INVENTION

The present invention relates to routing in a communications system, and especially to routing in a communication system in which call control and signalling is separated from traffic.

BACKGROUND ART

The following description of background art may include insights, discoveries, understandings or disclosures, or associations together with disclosures not known from the relevant art prior to the present invention but provided by the invention. Some such contributions of the invention may be specifically pointed out below, whereas other such contributions of the invention will be apparent from their context.

The evolution of communication technology, particularly IP-based (IP, Internet Protocol) communication technology and end user terminals, has enabled versatile communication possibilities and introduction of different services. More and more often services are implemented using an IP Multimedia Subsystem IMS, such as an All-IP system standardized by the 3GPP, and employing an IP-based session control protocol, such as a SIP (Session Initiation Protocol) protocol. IMS provides multimedia services which are usually, although not necessarily, Internet-based services employing a packet protocol. SIP is an IETF defined application-layer control protocol which is not vertically integrated into a communications system but a tool to build a multimedia architecture.

In order to ensure interworking between IMS networks and an exist circuit-switched network infrastructure, such as GSM (Global system for mobile communications), a platform called an MSC (mobile switching centre) server system has been developed. The MSC server system is independent of the transmission backbone networks, and it separates call control and signalling (control plane) and traffic (user plane) into separate network nodes, so that a network node called an MSC server (MSC-S) is responsible for call control, interworking with other domains and signalling, and a network node called a multimedia gateway (MGW) is responsible for switching and carrying the actual traffic. Although the separation enables the optimization of the traffic flows by locating MGWs closer to end users and by locating MSC-Ss near interconnection points, the traffic and signalling to or from a roaming subscriber still has to be circulated via a home network of the roaming subscriber in order to keep the connection management in the home network.

SUMMARY

An object of the present invention is to provide a more optimal routing of traffic. The object of the invention is achieved by a method, a system and a network node which are characterized by what is stated in the independent claims. The preferred embodiments of the invention are disclosed in the dependent claims.

BRIEF DESCRIPTION OF THE DRAWINGS

In the following the invention will be described in greater detail by means of preferred embodiments with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any network node, corresponding component(s), and/or to any communication system or any combination of different communication systems that support roaming and an MSC server system platform, or a corresponding platform. The communication system may be a fixed communication system or a wireless communication system or a communication system utilizing both fixed networks and wireless networks. The protocols used, the specifications of communication systems and network nodes, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system supporting the MSC server platform, a system having ISUP (ISDN user part) capable operator networks (end-points) that use SIP-I to convey ISUP and RTP (Real-Time Transport Protocol) to convey traffic (such as a voice stream, video stream, or multimedia stream) in inter-operator connections without restricting the embodiments to such a solution, however.

Figure 1:
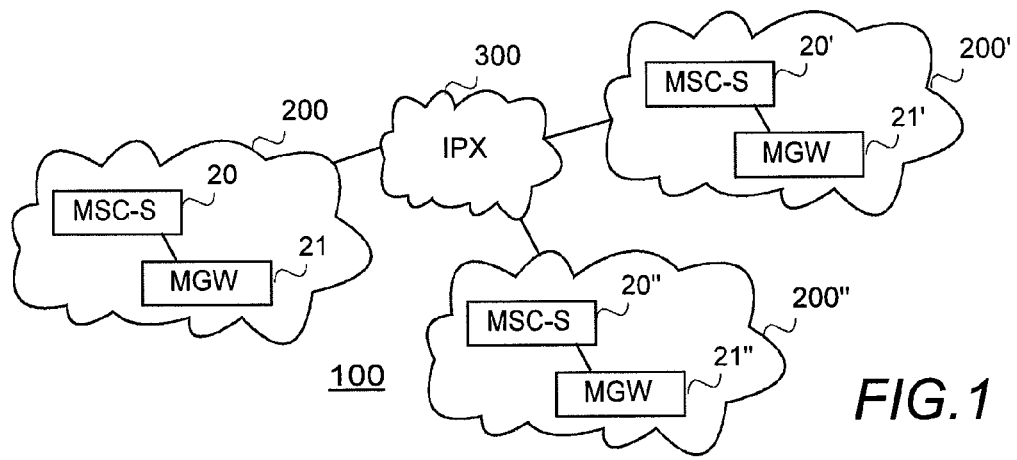
FIG. 1 shows the general architecture of a communication system.

A general architecture according to an embodiment is illustrated in FIG. 1. FIG. 1 shows a highly simplified system architecture only showing a communications system 100 having ISUP-capable operator networks 200, 200', 200" to which user terminals (not shown in FIG. 1) may connect, the operator networks being connected to each other via one or more inter-operator backbone networks 300 called IPX (IP packet exchange). Each of the illustrated operator networks 200, 200', 200" comprises one or more mobile switching centre servers (MSC-S) connected to one or more multimedia gateways (MGW). The connections shown in FIG. 1 are logical, operative connections; the actual physical connections may be different. It is apparent to a person skilled in the art that the system(s) also comprise(s) other devices, system entities, functions and structures that need not be described in detail herein.

It should be appreciated that the operator networks may be connected directly to each other, or by other means than IPX, such as another kind of a packet-switched network, for example. However, it is irrelevant to the invention how the operator networks are connected.

Figure 2:
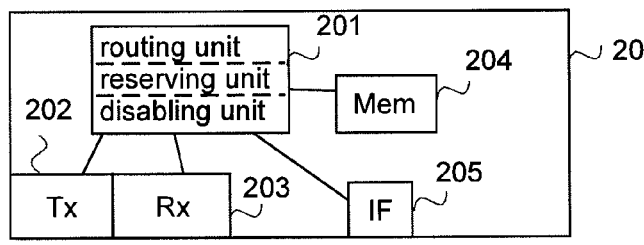
FIG. 2 is a simplified block diagram of a network node according to an embodiment.

FIG. 2 is a block diagram of a network node according to an embodiment of the invention. The network node is any node configured to process control traffic, such as signalling, and to allocate resources for the actual data traffic. Below the network node is called, for the sake of clarity, a mobile switching centre server. Although the mobile switching centre server has been depicted as one entity, different modules and memory may be implemented in one or more physical or logical entities. The mobile switching centre server may be any network node or a host via which a connection establishment request is routed in a home network of a subscriber.

The mobile switching centre server 200 is configured to handle control plane information exchange, such as call control, interworking with other domains, and signalling, such as requests relating to voice calls, and to select a multimedia gateway for switching and carrying the actual traffic. For this purpose, the mobile switching centre server comprises an interface 205 for communicating with the multimedia gateway, a routing and resource allocation unit 201 for providing routing of a connection establishment request and resource allocation for the connection, a receiving unit 203 for receiving different inputs, information and messages, a sending unit 202 for sending different outputs, information and messages and a memory 204 for storing routing related information at least temporarily. The routing and resource allocation unit 201 is configured to obtain information on a subscriber from a subscriber database, such as a home location server, to route a request according to the retrieved data and to be responsive to the receiving unit. Thus, the routing and resource allocation unit may be described as a unit comprising routing means for routing, reserving means for reserving resources and disabling means for disabling the reserving means, the disabling means being preferably responsive to a roaming home subscriber to disable the receiving means. Routing and resource allocation may be divided in separate units.

The functionality of the mobile switching centre server, or more precisely, different examples of a functionality of the routing and resource allocation unit 201, is described in more detail below with FIGS. 3 and 4. It should be appreciated that the mobile switching centre server may comprise other units used in or for relaying a connection establishment request or other messages. However, they are irrelevant to the actual invention and, therefore, they need not to be discussed in more detail here.

A mobile switching centre server, or a corresponding network node, implementing one or more functions of a corresponding mobile switching centre server described with an embodiment comprises not only prior art means, but also means for implementing the one or more functions of a mobile switching centre server described with an embodiment, and it may comprise separate means for each separate function, or the means may be configured to perform two or more functions. The mobile switching centre server may be configured as a computer or a microprocessor, such as single-chip computer element, including at least a memory for providing storage area used for arithmetic operation and an operation processor for executing the arithmetic operation. Present mobile switching centre servers comprise processors and memory that can be utilized when implementing an embodiment. The memory may be removable memory detachably connected to the mobile switching centre server. For example, the routing and resource allocation unit 201 may be a software application, or a module, or a unit configured as an arithmetic operation, or as a program (including an added or updated software routine), executed by an operation processor, such as a central processing unit. An embodiment provides a computer program embodied on any mobile switching centre server-readable distribution/data storage medium, comprising program instructions which, when loaded into a mobile switching centre server, constitute the routing and resource allocation unit. Programs, also called program products, including software routines, applets and macros, can be stored in any medium, and may be downloaded into the mobile switching centre server. In other words, all modifications and configurations required for implementing one or more functions of an embodiment may be implemented as added or updated software routines, application circuits (ASIC) and/or programmable circuits.

Figure 3:
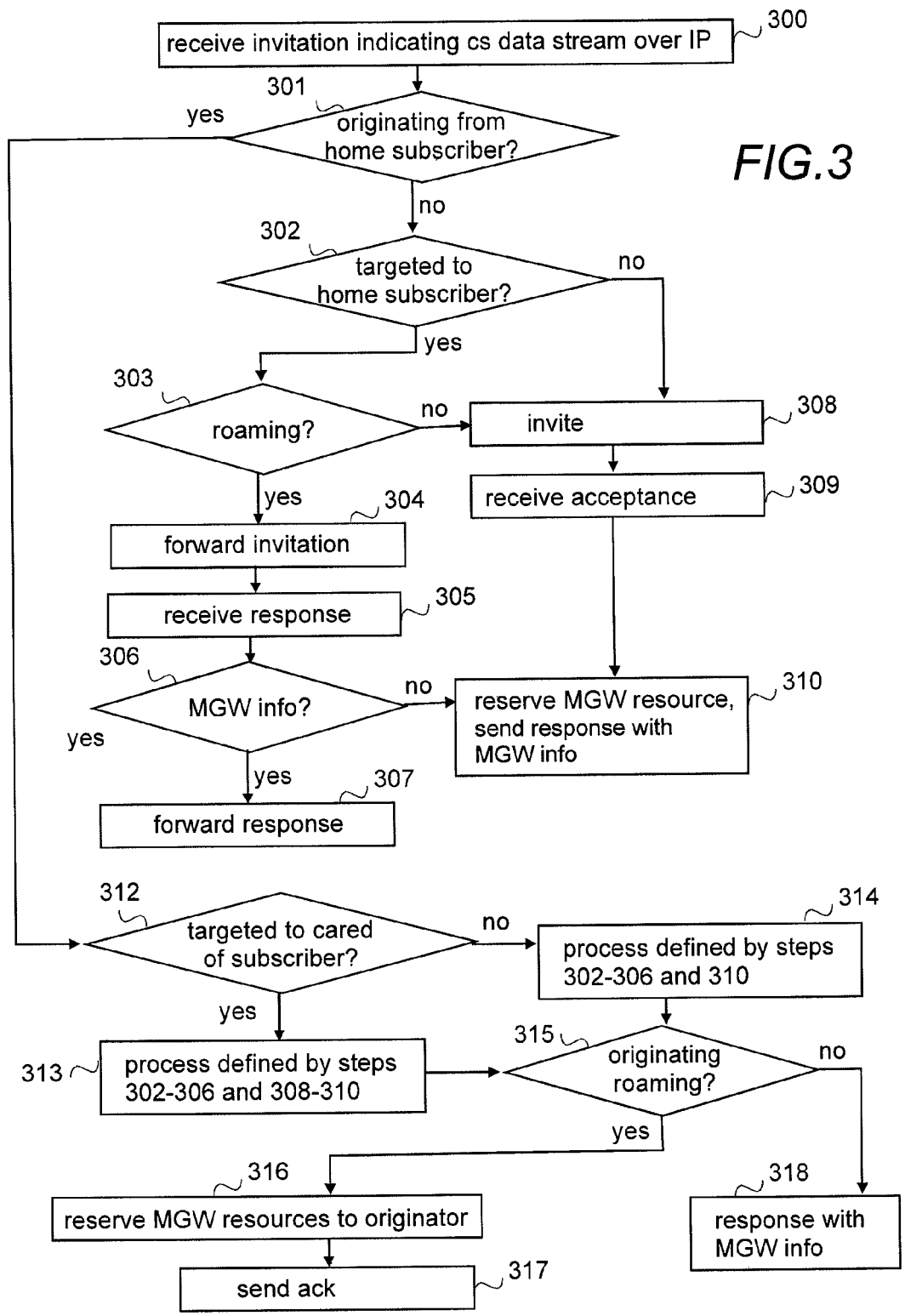
FIG. 3 is a flow chart illustrating a functionality of a network node according to an embodiment.

FIG. 3 is a flow chart illustrating the functionality of a mobile switching centre server MSC-S according to an embodiment in which a data stream is to be delivered over IP. For the sake of clarity, it is assumed that all network nodes, and thereby networks, involved support the MSC server platform. (If one of the network nodes/networks involved does not support the MSC server platform, it rejects the connection establishment request and no connection is formed.) Further assumptions are that the data stream is a circuit-switched data stream, the signalling relates to a voice call and that the called subscriber answers to the call.

Referring to FIG. 3, MSC-S receives (step 300) a connection establishment request which indicates that a circuit-switched data stream is to be delivered over IP. The connection establishment request, such as SIP-INVITE, typically itself indicates that a circuit-switched data stream is to be delivered over IP. In response to receiving the request, MSC-S first checks (not shown in FIG. 3), whether it supports the circuit-switched data stream over IP feature. Since MSC-S supports the feature, MSC-S checks, in step 301, whether the invitation originates from a home subscriber. If not, then MSC-C checks, in step 302, whether the invitation is targeted to a home subscriber. If yes, then MSC-S obtains the routing address of the home subscriber (not shown in FIG. 3), and checks, in step 303, from the routing address, whether or not the target subscriber is roaming.

If the target subscriber is roaming, MSC-S forwards, in step 304, the invitation towards the routing address, and after a while MSC-S receives, in step 305, a response to the request, the response indicating in the example that the target subscriber answers to the call (and that the roaming network supports the circuit-switched data stream over IP). Then MSC-S checks, in step 306, whether or not the response contains information on MGW.

If the response contains information on MGW (step 306), MSC-S forwards, in step 307, the response to the party from whom the invitation was received in step 301. Thus, the response contains an MGW address in the roaming network and no MGW resources are reserved in the home network.

If the subscriber is not roaming (step 303), MSC-S invites, in step 308, the subscriber by using ISUP signalling and after a while receives, in step 309, ISUP signalling indicating an acceptance of the invitation. In other words, MSC-S and the subscriber's user terminal exchange circuit-switched connection establishment signalling. After the acceptance is received, MSC-S reserves, in step 310, resources for user traffic to be sent over the connection from a multimedia gateway, and sends a response to the party from whom the invitation was received in step 301. This time the response contains an MGW address in the home network.

If the response received from a roaming subscriber does not contain MGW information (step 306), no MGW is reserved, and therefore MSC-S continues to step 310 to reserve resources to the user traffic of the connection from a multimedia gateway.

If the invitation is not targeted to a home subscriber (step 302), it is targeted to a roaming subscriber served by MSC-S, and MSC-S continues to step 308 to invite the subscriber.

If the invitation originates from a home subscriber (step 301), MSC-S checks, in step 312, whether the invitation is targeted to a cared of subscriber, the cared of subscriber being either a home subscriber (either in a roaming network or in the home network) or a visiting subscriber (a roaming subscriber served by MSC-S). If the invitation is targeted to a cared of subscriber, MSC-S performs, in step 313, the process defined by steps 302-306 and 308-310 and described above. If the invitation is not targeted to a cared of subscriber, MSC-S performs, in step 314, the process defined by steps 304-306 and 310, described above. After step 313 or 314, the target subscriber (called party) has the required resources reserved, and MSC-S checks, in step 315, whether the originating subscriber (calling party) is roaming. If the calling party is not roaming, MSC-S reserves, in step 316, MGW resources for the originating subscriber, this reserving including transmitting MGW information received in step 313 or 314. Then MSC-S sends, in step 317, an acknowledgement to the originating subscriber.

However, if the originating home subscriber is roaming (step 315), MSC-S does not reserve MGW resources but instead sends, in step 318, a response with MGW information received in step 313 or 314 towards the roaming network.

In an embodiment, in which a response received from a roaming subscriber (step 305) always contains MGW information when the invitation is accepted, MSC-S is configured, in response to detecting such a response, to forward the response (i.e., skip over step 306).

Figure 4:
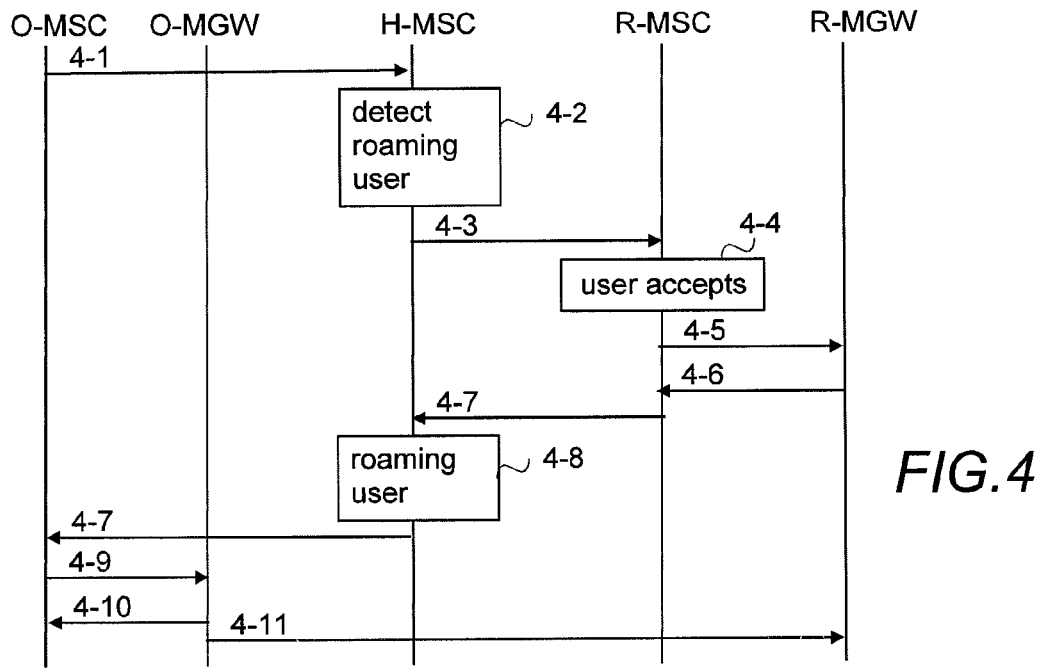
FIG. 4 illustrates signalling according to an embodiment.

FIG. 4 is a signalling flowchart illustrating signalling according to an embodiment. In the illustrated example, it is assumed that the signalling relates to a call and that a called subscriber is roaming and answers to the call. For the sake of clarity, the signalling between a mobile switching centre server O-MSC and a multimedia gateway O-MGW in an originating network, a mobile switching centre server R-MSC and a multimedia gateway R-MGW in the roaming network, and a mobile switching centre server H-MSC in the roaming subscriber's home network is illustrated, other signalling within the networks or signalling over IPX network(s) is not shown in FIG. 4.

A user, i.e., a caller in the originating network, has called a subscriber. Therefore O-MSC serving the caller sends message 4-1 to H-MSC. Message 4-1 is an inviting message, such as SIP INVITE.

In response to receiving message 4-1, H-MSC detects, in point 4-2, that the invite message is from a user located in another network, and targeted to a roaming subscriber. Further, H-MSC detects that Voice over IP is used. In response to detecting that the subscriber is roaming, H-MSC obtains a routing address and sends another inviting message, message 4-3 to R-MSC serving the subscriber. Message 4-3 is SIP INVITE, for example.

When the subscriber accepts the invitation (point 4-4), R-MSC reserves MGW resources from R-MGW by sending message 4-5. R-MGW reserves required resources and response by sending message 4-6. Then R-MSC responds to the request by sending message 4-7 containing MGW information on R-MGW.

In response to receiving message 4-7, H-MSC detects, in point 4-8 that it received MGW information in a response to an invitation sent to a roaming subscriber, and therefore, instead of reserving MGW resources in an MGW in the home network, H-MSC forwards message 4-7 to O-MSC, the message containing information on R-MGW. In other words, H-MSC sends R-MGW information as it were its own MGW information. When O-MSC receives message 4-7, O-MSC reserves required resources from O-MGW (messages 4-9 and 4-10), and O-MGW establishes an RTP connection by sending message 4-11 to R-MGW.

Then the user traffic flow is from O-MGW directly to R-MGW, the user traffic flow does not circulate via the roaming subscriber's home network. Thus, the actual user session (such as a voice call) is routed via a shortest part, thereby shortening the delay and enhancing the quality of calls, especially if the roaming distance is long (a subscriber having the home network in Finland is roaming in Hong Kong). However, the call control and other signalling still circulate via the roaming subscriber's home network, or more precisely via the mobile switching centre server in the roaming subscriber's network. This enables the home network to still supervise connections, and to provide a roaming subscriber more specific information on calls or roaming to a prepaid subscriber, for example.

In an embodiment of the invention, H-MSC analyzes, in point 4-8, the address of the multimedia gateway received in the response (message 4-7), and in response to the address being an address for another network, instead of reserving MGW resources in an MGW in the home network, H-MSC forwards message 4-7 to O-MSC.

As can be seen from the above, no changes are needed in the used protocols, and, therefore, there is no need to describe them in more detail here.

Although the embodiment has been described above assuming that the caller and the called are in different networks, they may be in the same network, i.e., the originating network may the network where the called is roaming.

Although the embodiment has been described above assuming that the called one is roaming, it is apparent to one skilled in the art that the calling party may be the one roaming or both are roaming, in which cases the calling party's home network's mobile switching centre server does not reserve MGW resources (the user traffic does not circulate via the home network).

Although the embodiment has been described above assuming that the connection establishment request or the used protocol indicates itself that a data stream is to be delivered over IP, it should be apparent that instead, or in addition to, the request may contain information indicating that a circuit-switched data stream is to be delivered over IP. Examples of the information indicating in a request that a circuit-switched data stream is to be delivered over IP include IAM (initial address message), the type of the data stream, requested/suggested codecs, and protocols used for delivering the data stream.

The steps/points, signalling messages and related functions described above in FIGS. 3 and 4 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or integrated together or replaced by a corresponding step/point or part of the step/point. The network node operations illustrate a procedure that may be implemented in one or more physical or logical entities. The signalling messages are only exemplary and may even comprise several separate messages for transmitting the same information. In addition, the messages may also contain other information.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
receiving a connection establishment request;
detecting that the connection establishment request relates to user data traffic requiring traffic resources;
forwarding the connection establishment request;
receiving an acceptance to the connection establishment request;
checking, in response to receiving the acceptance, whether the connection establishment request relates to a roaming home subscriber or to a served subscriber;
in response to the connection establishment request relating to a served subscriber, reserving resources for user data traffic, adding an indication of the reserved resources to the acceptance and sending the acceptance; and
in response to the connection establishment request relating to a roaming home subscriber, checking whether the acceptance indicates reserved resources, and sending the acceptance if the acceptance indicates reserved resources or reserving resources for user data traffic, adding an indication of the reserved resources to the acceptance and sending the acceptance if the acceptance does not indicate the reserved resources.

2. The method as claimed in claim 1, further comprising: implementing session establishment protocol in connection establishment.

3. A system comprising:
a first user terminal and a second user terminal;
an originating network serving the first user terminal, the originating network comprising a first switching server for control traffic and a first gateway comprising reservable traffic resources for user traffic;
a home network comprising a second switching server for control traffic and a second gateway comprising reservable traffic resources for user traffic; and
a serving network serving the second user terminal, the serving network comprising a third switching server for control traffic and a third gateway comprising reservable traffic resources for user traffic,
wherein the first switching server in the originating network is configured to send a connection establishment request received from the first user terminal and targeted to the second user terminal to the second switching server in the home network, and in response to receiving from the second switching server a response accepting the connection establishment request, to reserve first traffic resources for user traffic in the first gateway,
wherein the second switching server is configured to forward the connection establishment request to the third switching server in the serving network,
wherein the third switching server is configured, in response to the second user terminal accepting the connection establishment request, to reserve second traffic resources for user traffic from the third gateway, and to send a response to the request to the second switching server, the response containing information on the reserved second traffic resources in the third gateway,
wherein the second switching server is configured, in response to receiving the response to the connection establishment request, the response containing information on the reserved second traffic resources in the third gateway, to send a response to the connection establishment request to the first switching server, the response to the connection establishment request containing the information on the reserved second traffic resources in the third gateway,
wherein the first switching server is configured, in response to receiving the response to the connection establishment request from the second switching server, to forward the information on the reserved second traffic resources in the third gateway to the first gateway,
wherein the first gateway is configured to establish a connection to the third gateway for user traffic,
wherein the second switching server is a mobile switching center server,
wherein the second switching server is configured to control user data traffic and comprises at least:
one processor and one memory including computer program code,
wherein the memory and the computer program code are configured to, with the one processor, cause the second switching server at least to:
detect a connection establishment request relating to user data traffic requiring the traffic resources;
detect whether the connection establishment request relates to a roaming home subscriber; and
reserve, only in response to receiving an acceptance to the connection establishment request not relating to a roaming home subscriber, resources for the user data traffic from the second gateway.

4. The system as claimed in claim 3, wherein control traffic relating to the connection is sent from the first switching server to the third switching server via the second switching server and the user traffic is sent directly from the first gateway to the third gateway.

5. The system as claimed in claim 3, wherein at least one of the first user terminal and the second user terminal is roaming, and the home network is a home network of the roaming user terminal.

6. The system as claimed in claim 3, wherein the networks are circuit-switched networks supporting data streams over internet protocol and the connection establishment request relates to a circuit-switched data stream to be transmitted over internet protocol.

7. The system as claimed in claim 6, wherein the networks are connected to each other via at least one inter-operator backbone network, the backbone network being a packet-switched network.

8. The system as claimed in claim 3,
wherein the at least one memory and the computer program code are further configured to, with the at least one processor, cause the second switching server at least to:
check whether an acceptance to the request contains information on reserved resources; and
reserve, only in response to the acceptance containing the information and the connection establishment request not relating to a roaming home subscriber, resources for the user data traffic from the second gateway.

9. The system as claimed in claim 3, wherein the first gateway is a multimedia gateway, the second gateway is a multimedia gateway and the third gateway is a multimedia gateway.

10. A mobile switching center server configured to control user data traffic and comprising at least:
one processor; and
at least one memory including computer program code;

wherein the at least one memory and the computer program code are configured to, with the at least one processor, cause the mobile switching center server at least to:

detect a connection establishment request relating to user data traffic requiring user data traffic resources from a gateway;

detect whether the connection establishment request relates to a roaming home subscriber;

reserve, only in response to receiving an acceptance to the connection establishment request not relating to a roaming home subscriber, user data traffic resources for the user data traffic from the gateway;

check whether the acceptance contains information on reserved user data traffic resources; and reserve, only in response to the acceptance containing the information and the connection establishment request not relating to a roaming home subscriber, resources for the user data traffic from the gateway.

11. A system comprising:

a first user terminal and a second user terminal;

an originating network serving the first user terminal, the originating network comprising a first switching server for control traffic and a first gateway comprising reservable traffic resources for user traffic;

a home network comprising a second switching server for control traffic and a second gateway comprising reservable traffic resources for user traffic; and a serving network serving the second user terminal, the serving network comprising a third switching server for control traffic and a third gateway comprising reservable traffic resources for user traffic, wherein the first switching server in the originating network is configured to send a connection establishment request received from the first user terminal and targeted to the second user terminal to the second switching server in the home network, and in response to receiving from the second switching server a response accepting the connection establishment request, to reserve first traffic resources for user traffic in the first gateway, wherein the second switching server is configured to detect a connection establishment request relating to user data traffic requiring the traffic resources, to detect whether the connection establishment request relates to a roaming home subscriber, and to forward the connection establishment request to the third switching server in the serving network, wherein the third switching server is configured, in response to the second user terminal accepting the connection establishment request, to reserve second traffic resources for user traffic from the third gateway, and to send a response to the request to the second switching server, the response containing information on the reserved second traffic resources in the third gateway, wherein the second switching server is configured, in response to receiving the response to the connection establishment request, the response containing information on the reserved second traffic resources in the third gateway, to send a response to the connection establishment request to the first switching server, the response to the connection establishment request containing the information on the reserved second traffic resources in the third gateway, and, only in response to receiving an acceptance to the connection establishment request not relating to a roaming home subscriber, to reserve resources for the user data traffic from the second gateway and to send a response to the connection establishment request to the first switching server, the response to the connection establishment request containing the information on the reserved traffic resources in the second gateway, wherein the first switching server is configured, in response to receiving the response to the connection establishment request from the second switching server, to forward the information on the reserved traffic resources to the first gateway, and wherein the first gateway is configured to establish a connection to the one of the third gateway or to the second gateway whose reserved traffic resources for user traffic the information indicated.

12. A system comprising:

a first user terminal and a second user terminal;

an originating network serving the first user terminal, the originating network comprising a first switching server for control traffic and a first gateway comprising reservable traffic resources for user traffic;

a home network comprising a second switching server for control traffic and a second gateway comprising reservable traffic resources for user traffic; and a serving network serving the second user terminal, the serving network comprising a third switching server for control traffic and a third gateway comprising reservable traffic resources for user traffic, wherein the first switching server in the originating network is configured to send a connection establishment request received from the first user terminal and targeted to the second user terminal to the second switching server in the home network, and in response to receiving from the second switching server a response accepting the connection establishment request, to reserve first traffic resources for user traffic in the first gateway, wherein the second switching server is configured to detect a connection establishment request relating to user data traffic requiring the traffic resources, to detect whether the connection establishment request relates to a roaming home subscriber, and to forward the connection establishment request to the third switching server in the serving network, wherein the third switching server is configured, in response to the second user terminal accepting the connection establishment request, to reserve second traffic resources for user traffic from the third gateway, and to send a response to the request to the second switching server, the response containing information on the reserved second traffic resources in the third gateway, wherein the second switching server is configured, in response to receiving the response to the connection establishment request, to check whether response contains information on reserved traffic resources in the third gateway, to reserve, in response to the response containing the information and the connection establishment request not relating to a roaming home subscriber, or in response to the response not containing the information, resources for the user data traffic from the second gateway, and to send a response to the connection establishment request to the first switching server, the response to the connection establishment request containing the information on the reserved traffic resources in the second gateway, or in response to the response containing information on the reserved traffic resources in the third gateway and relating to a roaming home subscriber, to send a response to the connection establishment request to the first switching server, the response to the connection establishment request containing the information on the reserved traffic resources in the third gateway, wherein the first switching server is configured, in response to receiving the response to the connection establishment request from the second switching server, to forward the information on the reserved traffic resources in one of the second gateway and the third gateway to the first gateway, and wherein the first gateway is configured to establish a connection to the one of the second and the third gateway for user traffic.

* * * * *